United States Patent [19]

Trevisan

[11] Patent Number: 5,407,142
[45] Date of Patent: Apr. 18, 1995

[54] METHOD FOR PRODUCING STATOR WINDINGS FOR AN ELECTRIC MOTOR, PARTICULARLY A BRUSHLESS MOTOR

[75] Inventor: Mario Trevisan, Arese, Italy

[73] Assignee: Industrie Magneti Marelli S.p.A., Milan, Italy

[21] Appl. No.: 57,152

[22] Filed: May 5, 1993

[30] Foreign Application Priority Data

May 8, 1992 [IT] Italy .................. T092A0393

[51] Int. Cl.⁶ .................. B65H 81/06; H02K 15/04; H02K 15/14
[52] U.S. Cl. .................. 242/1.1 R; 29/596; 242/7.05 B
[58] Field of Search .................. 242/1.1 R, 7.05 B; 29/596, 598

[56] References Cited

U.S. PATENT DOCUMENTS

| | | | |
|---|---|---|---|
| 2,783,403 | 2/1957 | Schumaier | 310/202 |
| 2,942,793 | 6/1960 | Moore | 242/7.05 B |
| 3,524,601 | 8/1970 | Biddison et al. | 242/7.05 B |
| 3,705,459 | 12/1972 | Biddison | 29/596 |
| 4,614,022 | 9/1986 | Biddy et al. | 242/1.1 R X |
| 4,836,461 | 6/1989 | Koizumi et al. | 242/1.1 R |
| 5,064,128 | 11/1991 | Iwase | 242/7.05 B |
| 5,090,110 | 2/1992 | Murakoshi et al. | 29/596 |
| 5,095,610 | 3/1992 | Schultz et al. | 29/596 |

FOREIGN PATENT DOCUMENTS

| | | |
|---|---|---|
| 0250839 | 1/1988 | European Pat. Off. . |
| 2348641 | 4/1975 | Germany . |
| 723684 | 2/1955 | United Kingdom . |

Primary Examiner—Daniel P. Stodola
Assistant Examiner—Michael R. Mansen
Attorney, Agent, or Firm—Edward D. Manzo; Ted K. Ringsred

[57] ABSTRACT

A method for producing stator windings for an electric motor, particularly a brushless motor, with n phases. The stator is disposed inside the rotor and its periphery is divided into a plurality of pole extensions. n conducting wires are then wound around equiangularly spaced groups of polar extensions forming n first coils. The wires are then wound around further groups of polar extensions, adjacent to the first groups, avoiding any superpositions between adjacent coils formed by a same wire. The process is then repeated so that the successions of coils formed by each of the wires is progressively superimposed to the successions of coils formed by the other wires, forming n equiangularly spaced spirals.

4 Claims, 7 Drawing Sheets

METHOD FOR PRODUCING STATOR WINDINGS FOR AN ELECTRIC MOTOR, PARTICULARLY A BRUSHLESS MOTOR

BACKGROUND OF THE INVENTION

FIELD OF THE INVENTION

The present invention relates to a method of producing stator windings for an electric motor, particularly a brushless motor with n phases (n>2), of the type in which the stator is disposed inside the rotor and has a plurality of equiangularly spaced outer longitudinal recesses, which divide its periphery into a corresponding plurality of pole extensions.

SUMMARY OF THE INVENTION

The object of the present invention is to provide a method of producing stator windings for an electric motor of this type, in which the windings corresponding to each phase have impedances and, in particular, resistances, which are as similar as possible to one another.

This object is achieved according to the invention by a method in which winding commences from n equiangularly spaced positions. Each of n wires is passed in the same sense of winding about the axis of the stator around respective successive groups of pole extensions, each group comprising the same number of pole extensions, so that the wires form n windings which are superimposed in the sense of winding, substantially like n identical, equiangularly spaced spirals.

To ensure that the windings have identical geometric form, the winding of the n wires is started substantially simultaneously.

The wires can be passed around successive groups of pole extensions so as to form lapped or waved windings.

A further object of the invention is equipment for implementing the method.

BRIEF DESCRIPTION OF THE DRAWINGS

Further characteristics and advantages of the invention will become apparent from the following detailed description with reference to the appended drawings, provided purely by way of non-limiting example, in which.

DESCRIPTION OF THE PREFERRED EMBODIMENT

Figure 1:
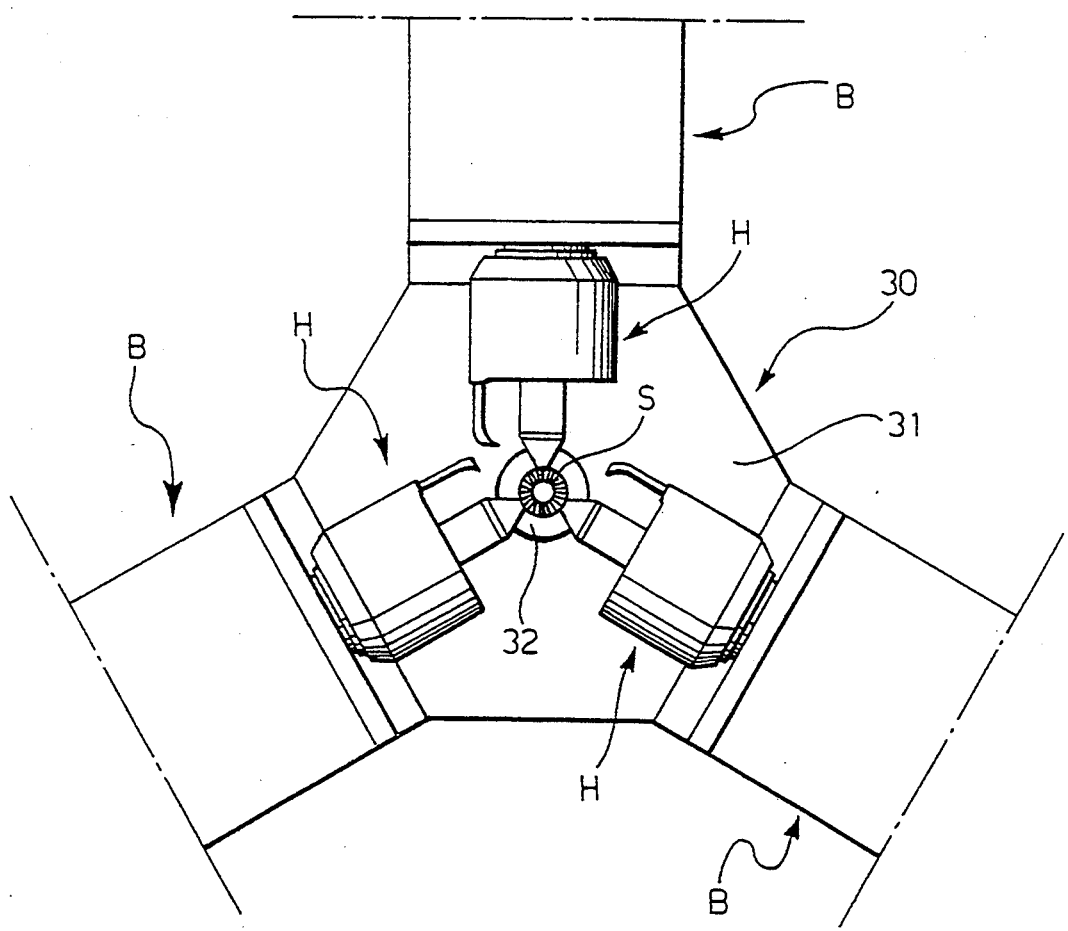
FIG. 1 is a plan view of equipment for implementing the method according to the invention.

FIG. 1 is a schematic drawing of the equipment for producing the stator windings of a three-phase brushless motor according to the invention. The equipment includes a support structure 30 including a bed 31 which, in the embodiment illustrated by way of example, is substantially hexagonal. A support 32 is mounted rotatably in the centre of the bed for receiving and restraining the stator S of a brushless electric motor on which the three phase windings are to be formed. The stator S is supported with its axis arranged vertically (FIG. 1 is a plan view).

The equipment shown in FIG. 1 includes three winding machines B spaced 120° apart, in correspondence with three sides of the bed 31. The winding machines are, for example, Freely (trade name) machines, and their respective winding heads H are spaced at regular intervals around the axis of the stator S. Each of the winding heads can insert a respective wire in the recesses of the stator S, and wind it in the manner which will now be described with reference to FIGS. 2 to 6.

In these drawings a stator for a three-phase brushless motor of the type in which a stator is disposed inside the rotor, is shown by way of example.

The stator S illustrated is generally cylindrical, and has 24 equiangularly spaced outer longitudinal recesses C which divide its periphery into a corresponding plurality of pole extensions which, for the sake of convenience, are indicated 1–24.

Figure 7:
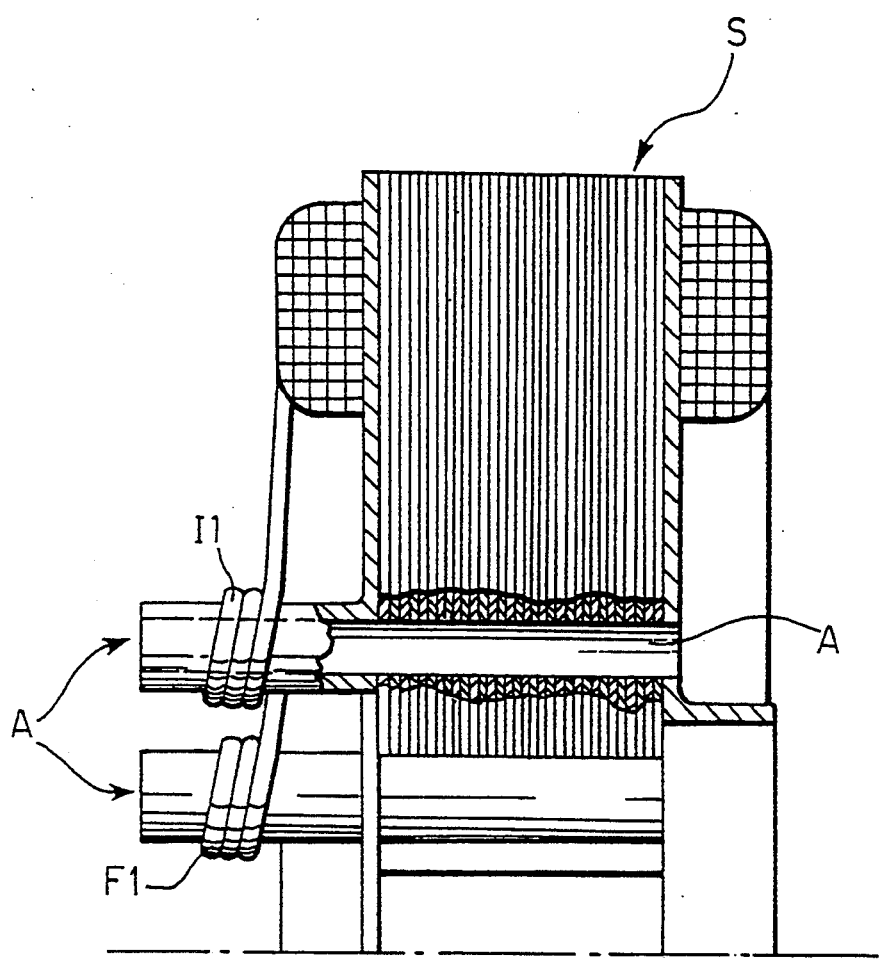
FIG. 7 is a sectional view taken on the line VII—VII of FIG. 6.

As can be seen in FIG. 7, the stator S comprises a pack of blanked core laminations. Six equiangularly spaced pins A, driven into the pack of core laminations, are disposed parallel to the axis of the stator and protrude from a single flat face of the stator. The leading and tail ends of the stator windings are connected to the ends of the pins which project from the pack of stator core laminations.

The windings are formed as follows.

In the embodiment illustrated, as already said, the stator is of the three-phase type and has 24 recesses disposed between 24 pole extensions. In order to produce a three-phase eight-pole winding, three recesses, and therefore three pole extensions, rare associated with each pole.

FIGS. 2 to 6 show successive stages in the formation of the three windings. In particular, in these drawings the windings are of the lapped type, although the method according to the invention also enables wave windings to be produced.

Figure 2:
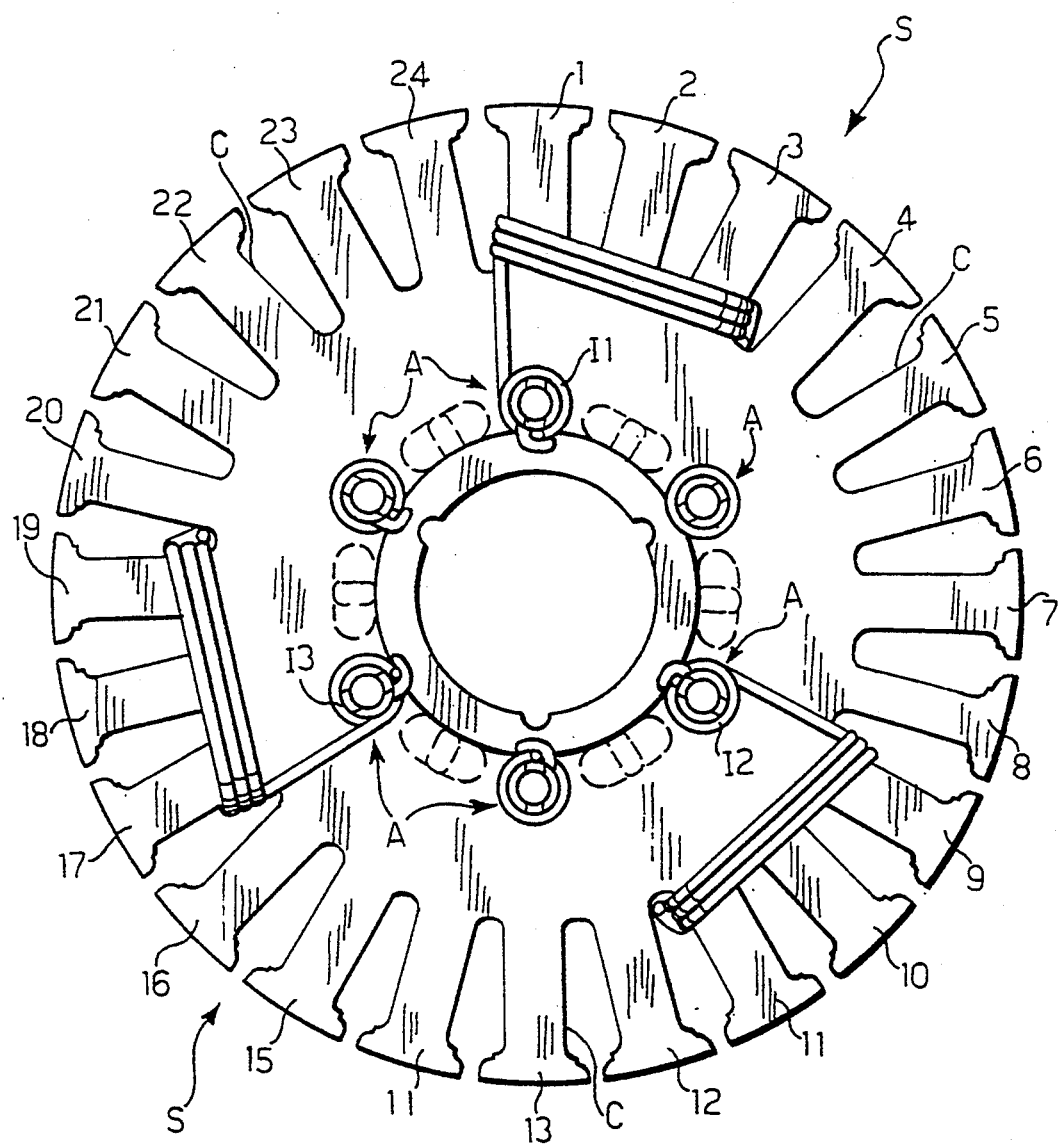
FIGS. 2 to 6 are front views of a stator of a three-phase brushless electric motor in five successive stages of the formation of its windings.

With reference to FIG. 2, the windings are formed starting from three equiangularly spaced pins, onto which the leading ends of the windings, indicated I1, I2 and I3, are wound. Each of the three wires used to form the three windings is then passed around respective successive groups of three pole extensions, each wire being wound in the same manner. Thus, in particular, the wire whose leading end is indicated as I1 in FIG. 2, is initially led into the recess between the pole extensions 24 and 1, extends through this recess, is then passed around the rear of the pole extensions 1 to 3, then returns to the front face of the stator from which it started, passes through the recess between the pole extensions 3 and 4 and passing around the pole extensions 1 and 3 once again, goes back into the recess between the extensions 24 and 1. A first coil is thus formed around the pole extensions 1 to 3. In the embodiment illustrated as an example, the three wires which form the winding are wound around respective groups of three adjacent pole extensions 1–3, 9–11 and 17–19, around which they form three coils. The number of coils, however, is given purely by way of example. When the coils have been formed, the stator is as shown in FIG. 2.

Figure 3:
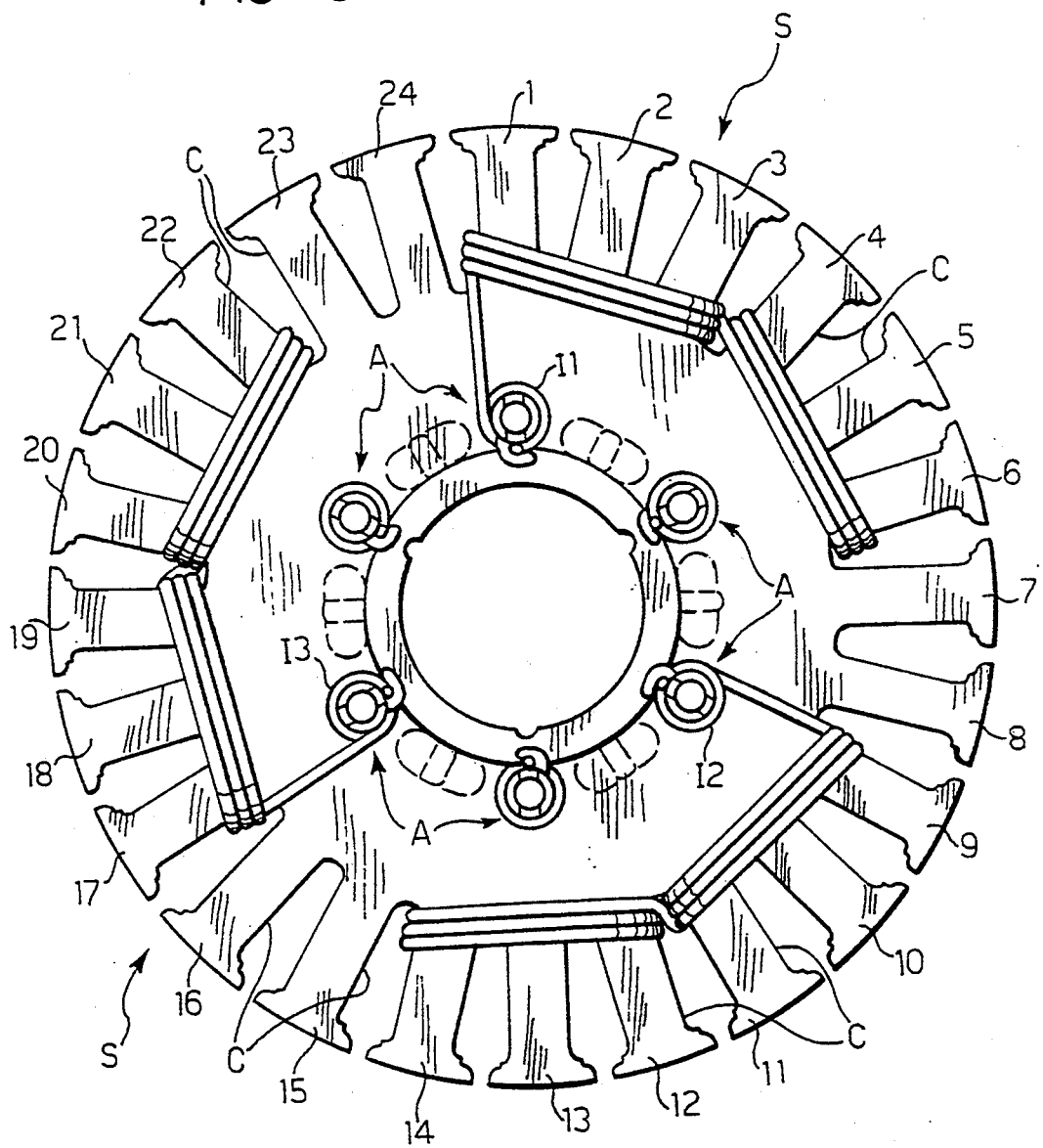

As can be seen in FIG. 3, the formation of the windings continues with the formation of coils around subsequent groups of three pole extensions 4–6, 12–14 and 20–22. The coils around these groups of three pole extensions are wound in the opposite sense to those around the groups of three 1–3, 9–11 and 17–19. Starting from the condition shown in FIG. 3, coils are then formed on the groups of three pole extensions 7–9, 15–17 and 23–1. The coils wound on these groups of three are wound in the same sense as those wound around the groups of three 1–3, 9–11 and 17–19.

Figure 4:
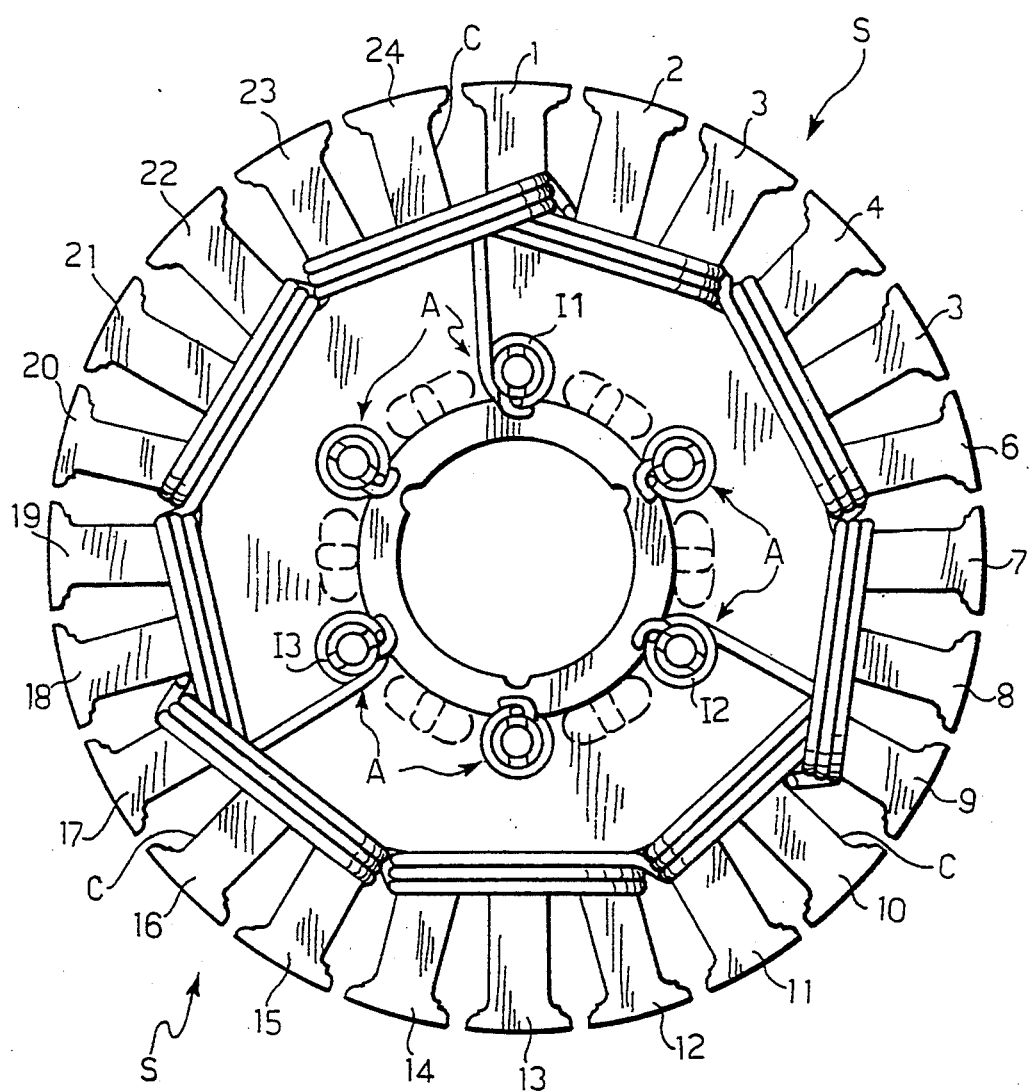

With reference to FIG. 4, it should be noted that the coils wound around the groups of three pole extensions 7–9, 15–17 and 23–1 partly overlap the coils wound around the groups of three 9–11, 17–19 and 1–3.

The formation of the windings then continues in a manner similar to that described hitherto, with the formation of coils around the groups of three pole extensions 10–12, 18–20 and 2–4, having a sense of winding being the opposite of that of the coils formed previously.

Figure 5:
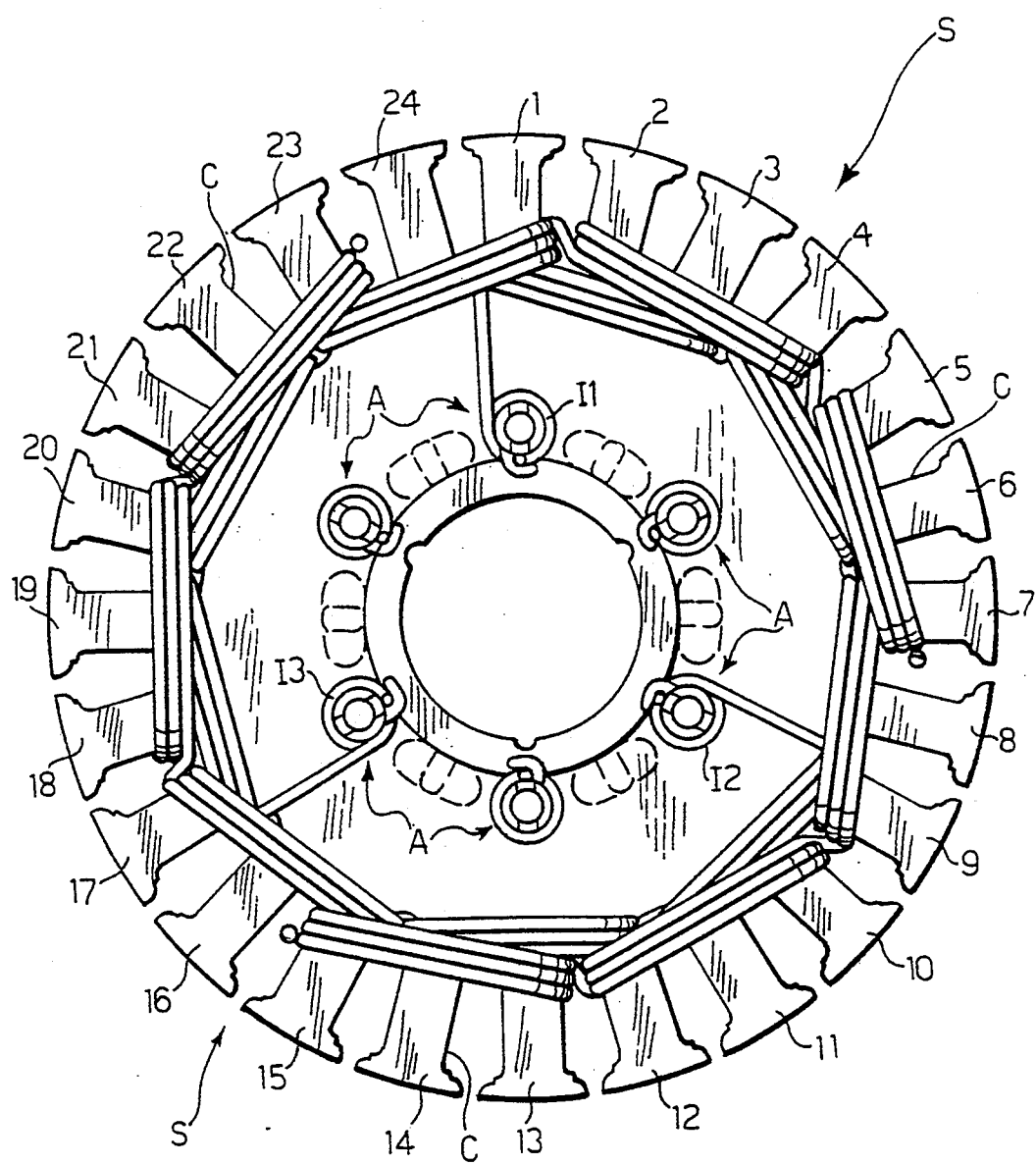

FIG. 5 shows a further intermediate stage in the formation of the windings, which is reached if one continues to proceed in a manner similar to that described so far.

Figure 6:
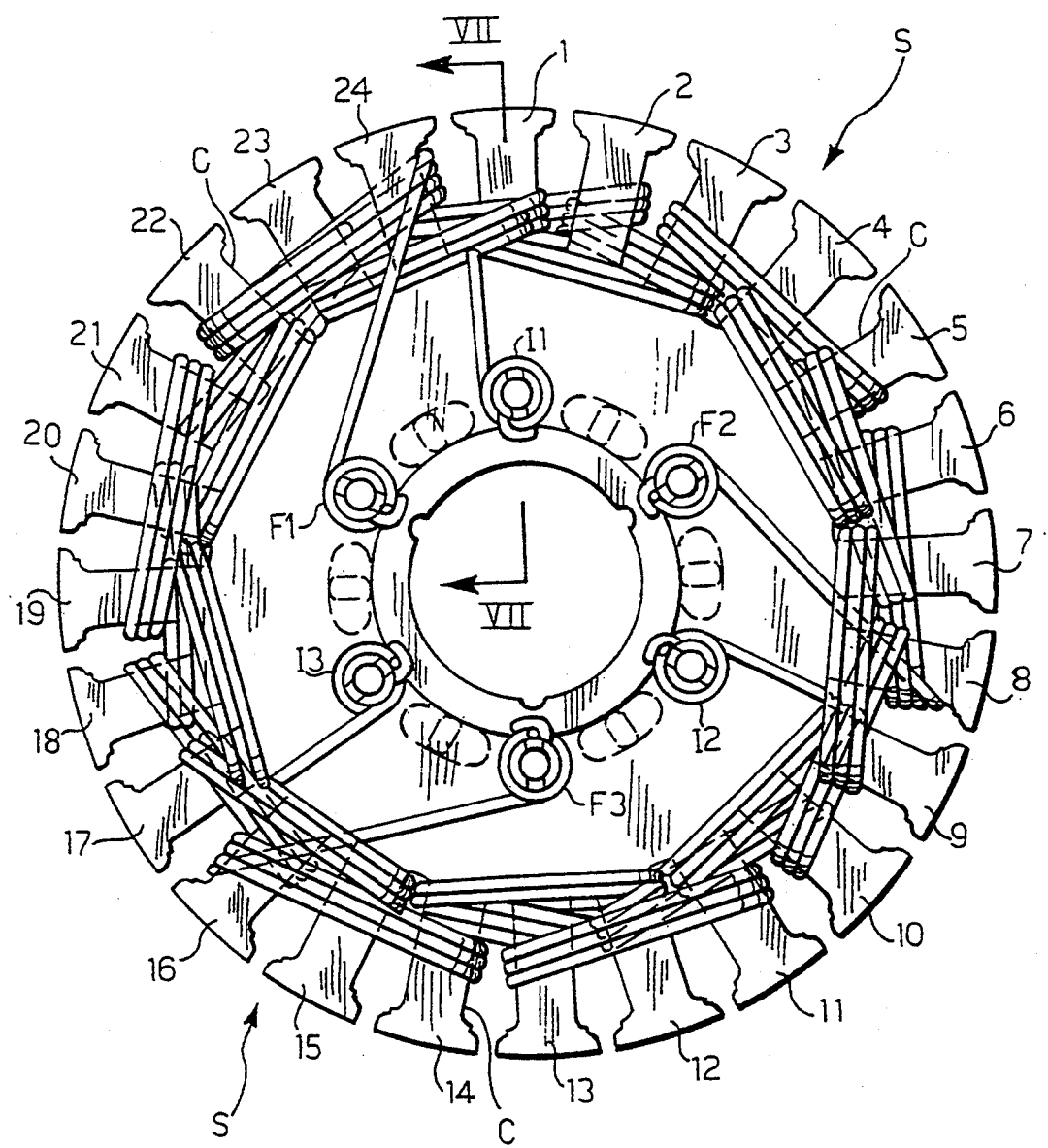

FIG. 6 shows the stator S with the winding completed. The tail ends of the windings, indicated F1, F2 and F3 respectively, are wound onto three equiangularly spaced pins, alternating with those onto which their leading ends are wound.

As shown by the foregoing description and by an examination of FIGS. 2 to 6, the three stator windings I1–F1, I2–F2 and I3–F3 are formed by being wound in the same sense about the axis of the stator. The windings are therefore superimposed in steps in the sense of winding, substantially like three geometrically identical and equiangularly spaced coils.

The fact that the three windings are perfectly identical geometrically, means that their impedances are exactly the same.

As already said, the three windings I1–F1, I2–F2 and I3–F3 are advantageously started and completed simultaneously, with the use of three winding machines B spaced 120° apart. On the other hand, although it would be less convenient, one could initially start the formation of one winding, for example the formation of I1–F1, and then start the formation of I2–F2 followed by I3–F3 at intervals which, in order to ensure that the three windings have the required identical geometrical form upon completion of the operation, would have to be less than the time taken for the winding started at I1 to be superimposed on the first coils of the winding started at I2 etc.

Naturally, if the three windings are started at intervals, they will also be completed at intervals.

With reference to FIG. 1, in order to produce lapped stator windings, (such as those described above with reference to FIGS. 2 to 6), the support 32 for the stator S must be rotated in steps or jerks if, as is undoubtedly preferable, the winding heads H are kept stationary. For this purpose the stator support 32 may be associated with a movement system synchronised in a known manner with the operation of the winding heads.

In order to produce wave windings, however, the support 32 for the stator S must of course be rotated at a higher frequency than for lap windings, and at a speed of rotation controlled in synchronism with operation of the winding heads.

Naturally, the principle of the invention remaining the same, the forms of embodiment and details of construction may be varied widely with respect to those described and illustrated purely by way of non-limiting example, without thereby departing from the scope of the present invention.

I claim:

1. A winding method for a stator of an electric motor, particularly a polyphase brushless motor having n phases, said stator being substantially cylindrical with a longitudinal axis and having a plurality of equiangularly spaced outer longitudinal recesses which divide its periphery into a corresponding plurality of pole extensions, said method comprising the steps of:

(a) winding n conducting wires around respective equiangularly spaced first groups of polar extensions, each of said windings including a same number of polar extensions so as to form n first coils having a same number of turns;

(b) winding said conducting wires around respective equiangularly spaced further groups of polar extensions adjacent to said first groups around which said conducting wires have been previously wound, said winding proceeding in a same sense around said longitudinal axis of said stator and avoiding any superpositions between adjacent coils formed by a same wire; and (c) further winding said conducting wires by repeating preceding winding step b., so that each succession of coils formed by each of said conducting wires is progressively superimposed over successions of coils formed by the other conducting wires forming n substantially equiangularly spaced spirals.

2. A method according to claim 1, wherein the winding of the n conducting wires is started substantially simultaneously.

3. A method according to claim 1, wherein the n wires are passed around successive groups of pole extensions so as to form a lap winding.

4. A method according to claim 1, wherein the n conducting wires are passed around successive groups of pole extensions so as to form a wave winding.

* * * * *